US011413540B2

(12) United States Patent
Curtis et al.

(10) Patent No.: US 11,413,540 B2
(45) Date of Patent: *Aug. 16, 2022

(54) SYSTEM AND METHOD FOR DYNAMICALLY DETERMINING CRAFTING PARAMETERS BASED ON USER USAGE RATE OF A VIRTUAL SPACE

(71) Applicant: Kabam, Inc., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/021,628

(22) Filed: Sep. 15, 2020

(65) Prior Publication Data

US 2021/0001230 A1 Jan. 7, 2021

Related U.S. Application Data

(63) Continuation of application No. 16/425,703, filed on May 29, 2019, now Pat. No. 10,799,796, which is a
(Continued)

(51) Int. Cl.
*A63F 13/45* (2014.01)
*A63F 13/35* (2014.01)
(Continued)

(52) U.S. Cl.
CPC ............... *A63F 13/67* (2014.09); *A63F 13/35* (2014.09); *A63F 13/45* (2014.09); *A63F 13/58* (2014.09);
(Continued)

(58) Field of Classification Search
CPC ........ A63F 13/35–80; G06Q 30/00–06; G07F 17/32
See application file for complete search history.

(56) References Cited

U.S. PATENT DOCUMENTS 5,370,399 A    12/1994  Liverance
6,106,395 A     8/2000  Begis
(Continued)

OTHER PUBLICATIONS

Mapping Resources to State Functions in Massively Multiplayer Online Games Viknashvaran Narayanasamy, Kok Wai Wong (Year: 2007).*
(Continued)

*Primary Examiner* — Emerson C Puente
*Assistant Examiner* — Paul V Mills
(74) *Attorney, Agent, or Firm* — Esplin & Associates, PC

(57) ABSTRACT

A system and method for dynamically determining parameters of crafting activities for individual users in a virtual space are disclosed. The crafting activity parameters may be determined based on rate of usage of the virtual space by the users. In some examples, a user usage rate of the virtual space may be determined to measure an amount of time a user spend in the virtual space during a period of real-world time. Based on the determined user usage rate of the virtual space, crafting activity parameters may be determined, for example, to balance differences in time spent in the virtual space by the users. In some implementations, for such determinations of the crafting activity parameters, one or more user normalization standards may be obtained.

14 Claims, 3 Drawing Sheets

Related U.S. Application Data continuation of application No. 15/344,362, filed on Nov. 4, 2016, now Pat. No. 10,343,068, which is a continuation of application No. 13/862,734, filed on Apr. 15, 2013, now Pat. No. 9,517,416.

(51) Int. Cl.

| | | |
|---|---|---|
| *A63F 13/80* | (2014.01) | |
| *A63F 13/792* | (2014.01) | |
| *G06Q 30/02* | (2012.01) | |
| *G06Q 30/06* | (2012.01) | |
| *A63F 13/58* | (2014.01) | |
| *A63F 13/63* | (2014.01) | |
| *G06Q 30/00* | (2012.01) | |
| *A63F 13/67* | (2014.01) | |
| *G07F 17/32* | (2006.01) | |

(52) U.S. Cl.
CPC ............ *A63F 13/63* (2014.09); *A63F 13/792* (2014.09); *A63F 13/80* (2014.09); *G06Q 30/00* (2013.01); *G06Q 30/0201* (2013.01); *G06Q 30/0207* (2013.01); *G06Q 30/0209* (2013.01); *G06Q 30/06* (2013.01); *G07F 17/32* (2013.01)

(56) References Cited

U.S. PATENT DOCUMENTS

| | | |
|---|---|---|
| 6,267,677 B1 | 7/2001 | Tajiri |
| 6,273,814 B1 | 8/2001 | Komoto |
| 6,439,998 B1 | 8/2002 | Itou |
| 6,585,599 B1 | 7/2003 | Horigami |
| 6,648,760 B1 | 11/2003 | Nicastro |
| 7,824,256 B2 | 11/2010 | Hatayama |
| 8,221,220 B2 | 7/2012 | Ackley |
| 8,317,598 B2 | 11/2012 | McNally |
| 8,328,642 B2 | 12/2012 | Mosites |
| 8,337,300 B2 | 12/2012 | Bowers |
| 10,343,068 B2 | 7/2019 | Curtis |
| 10,549,201 B2 | 2/2020 | Curtis |
| 10,799,796 B2 | 10/2020 | Curtis |
| 2003/0100375 A1 | 5/2003 | Wakae |
| 2005/0096975 A1 | 5/2005 | Moshe |
| 2006/0287076 A1 | 12/2006 | Kobayashi |
| 2007/0112706 A1 | 5/2007 | Herbrich |
| 2007/0129148 A1 | 6/2007 | Luchene |
| 2008/0004094 A1 | 1/2008 | Mueller |
| 2008/0039204 A1 | 2/2008 | Ackley |
| 2008/0182658 A1 | 7/2008 | Sakuma |
| 2008/0188312 A1 | 8/2008 | Seelig |
| 2009/0011830 A1 | 1/2009 | Wang |
| 2009/0029769 A1 | 1/2009 | Muller |
| 2009/0042645 A1 | 2/2009 | Graham |
| 2009/0061989 A1 | 3/2009 | Kim |
| 2010/0022289 A1 | 1/2010 | Menicou |
| 2010/0022301 A1 | 1/2010 | Carpenter |
| 2010/0100820 A1 | 4/2010 | Bryant |
| 2010/0227669 A1 | 9/2010 | Luchene |
| 2010/0227677 A1 | 9/2010 | Baerlocher |
| 2010/0240443 A1 | 9/2010 | Baerlocher |
| 2010/0323775 A1 | 12/2010 | Stanley |
| 2011/0261071 A1 | 10/2011 | Ganetakos |
| 2011/0319158 A1 | 12/2011 | Champagne |
| 2012/0036020 A1 | 2/2012 | Flinn |
| 2012/0225723 A1 | 9/2012 | Webster |
| 2012/0290948 A1 | 11/2012 | Elenzil |
| 2012/0329549 A1 | 12/2012 | Johnson |
| 2013/0079145 A1 | 3/2013 | Lam |
| 2013/0288757 A1 | 10/2013 | Guthridge |
| 2013/0288766 A1 | 10/2013 | Terashima |
| 2013/0316782 A1 | 11/2013 | Daniels |
| 2014/0024460 A1 | 1/2014 | Fox |
| 2014/0073416 A1 | 3/2014 | Toyama |
| 2014/0087880 A1 | 3/2014 | Betts |
| 2015/0011286 A1 | 1/2015 | Kim |
| 2017/0072318 A1 | 3/2017 | Curtis |
| 2019/0275432 A1 | 9/2019 | Curtis |
| 2020/0139250 A1 | 5/2020 | Curtis |

OTHER PUBLICATIONS

"Online gaming" Britannica Online Encyclopedia Retrieved from: www.britannica.com/technology/online-gaming (Year: 2018) (3 pages).

A Proposal for the Crafting System Author identified by handle "Gicker" http://forum.square-enix.com/ffxiv/threads/10176-A-Proposal-for-the-Crafting-System (Year: 2011), 2 pages.

China imposes online gaming curbs, BBC News, Published: Aug. 25, 2005; 3 pages.

Crafting and skill progression in MMOs—job or game? Author identified by handle "Procne" https://firstearthgame.com/forum/104 (Year: 2012), 20 pages.

Definition of Online Game Oxford Dictionary on Lexico.com Retrieved from: www.lexico.com/en/definition/online_game (Year: 2020) (1 page).

Fallen Earth Development Blog, Fallen Earth goes Free2Play Oct. 12!, Author(s) identified by handle: "Joseph / Linus", Published: Sep. 2, 2011, 10 pages.

Fields, Tim, and Cotton, Brandon, "Virtual Goods—An Excerpt from Social Game Design: Monetization Methods and Mechanics,", Published: Feb. 10, 2012, 7 pages.

Final Fantasy XIV's Play-Limiting Fatigue System Explained—Update; Mike Fahey; Published: Aug. 25, 2010; 4 pages.

Finally, Rest For The Wicked, Damion Schubert http://www.zenofdesign.com/finally-rest-for-the-wicked/#more (Year: 2005), 3 pages.

Firaxis Games, Sid Meier's Civilization V, 2K Games, 2010, 233 pages.

Mekanismer som pavirker bruksmengden av online rollespill [Translation: Mechanisms that affect the amount of use of online role playing games] Trond Viggo Bjerke; Published 2007, pp. i, 1-5, 13-20, 45, 51-60 translated via Google Translate Oct. 28, 2017.

MM or PG design for time-limited players Oct. 18, 2012, Retrieved from: https://gamedev.stackexchange.com/questions/40146/mmorpg-design-for-time-limited-players, 10 pages.

Nest Building with Lucius and Princess K: The Empowerment System; Published: May 26, 2011, 2 pages.

Notice on the implementation of the online game anti-addiction system for protecting the physical and mental health of minors, Central Government of the People's Republic of China Translation obtained via Google Translate Aug. 16, 2018 (Year: 2007), 14 pages.

Sundren Wiki; Pages: "Main Page" and "Crafting System"; Published Sep. 25, 2012; http://www.sundren.org/wiki/index.php?title=Main_Page&oldid=10946; http://www.sundren.org/wiki/index.php?title+Crafting_System&oldid=8549; 9 pages.

Sundren.org Forum thread: "Changing the crafting fatigue system (need opinions)"; Posted by "Kaeldorn"; Latest post published: Jun. 6, 2009; http://www.sundren.org/forum/printthread.php?t=11531&pp=40; 10 pages.

Wurm Online Description and Webpage Collection; Rolf Jansson; Publication Date: None later than Dec. 2, 2012, 128 pages.

\* cited by examiner

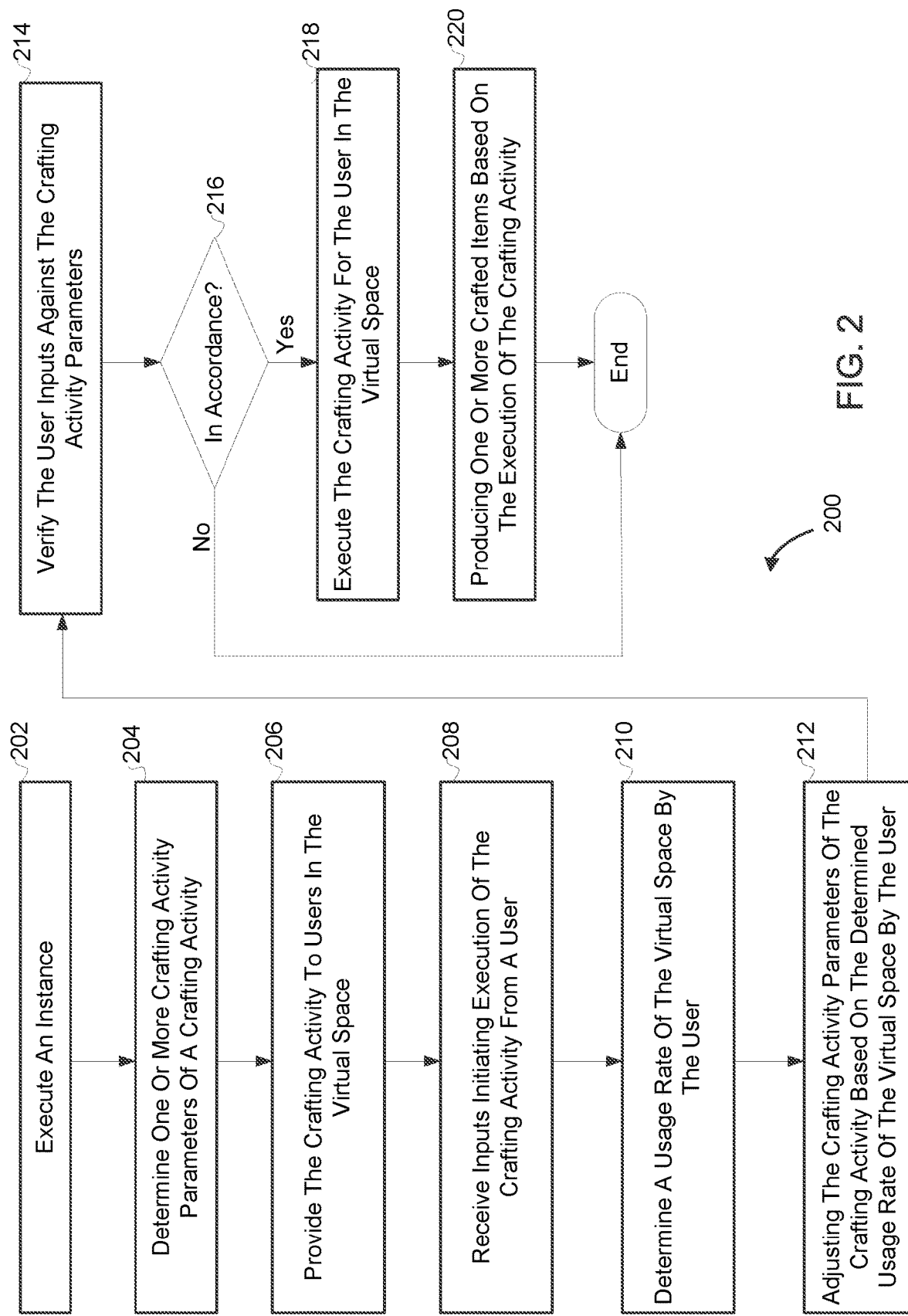

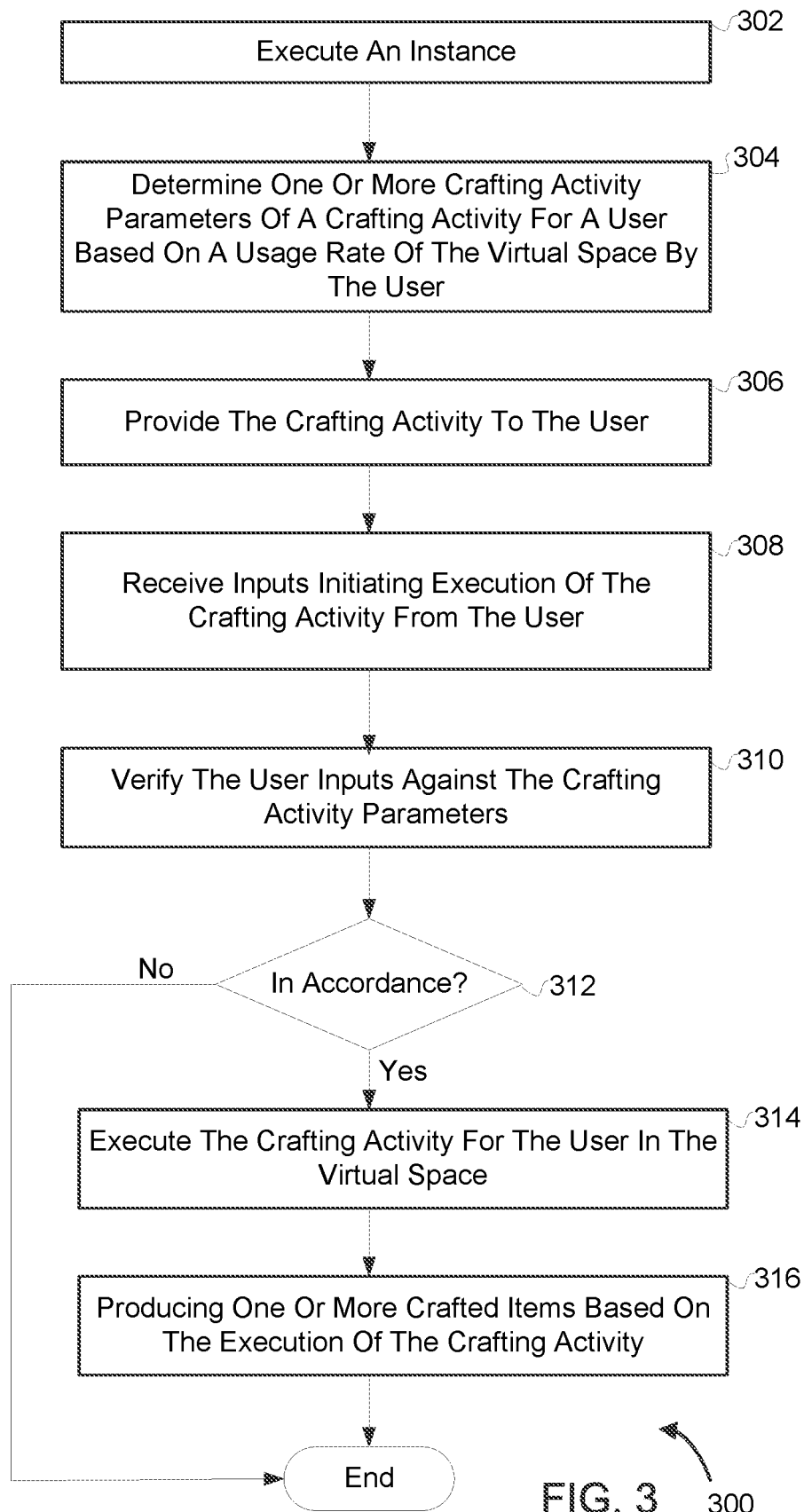

SYSTEM AND METHOD FOR DYNAMICALLY DETERMINING CRAFTING PARAMETERS BASED ON USER USAGE RATE OF A VIRTUAL SPACE

FIELD OF THE DISCLOSURE

This disclosure relates to balancing differences in user interactions with a virtual space, the balancing being made by dynamically determining parameters of crafting activities based on rates of usage of the virtual space by users.

BACKGROUND

Virtual space systems that provide crafting activities for users to craft virtual items are known. In those systems, crafting requirements such as an amount and/or types of resources needed for crafting an item, time duration for the crafting, a profession or skill required for the crafting and/or a virtual space location for the crafting are typically determined statically for all users in the virtual space.

SUMMARY

One aspect of the disclosure relates to dynamically determining crafting activity parameters for a crafting activity initiated by a user based on a usage rate of a virtual space by the user. The usage rate may be determined based on an amount of time spent by the user in a period of real world time. The dynamically determined crafting activity parameters may include a time, resource, recipe, outcome, success rate, and/or any other parameters of the crafting activity. Based on user input indicating that the crafting activity should be initiated, and in accordance with the determined parameters of the crafting activity, execution of the crafting activity may be made in the virtual space. In some implementations, one or more normalization standards related to balancing differences in time spent in the virtual space by the users may be obtained. In those implementations, the parameters of the crafting activity may be determined based on the obtained normalization standards. Such dynamic determinations of parameters for executing the crafting activity in the virtual space may balance effects caused by differences in usage of the virtual space between users. Accordingly, unlike the conventional virtual space systems, this may make the virtual space accessible to users who spend less time than others in the virtual space.

In some implementations, a system configured to dynamically determine crafting parameters based on user usage rate of a virtual space may include a server. The server may operate in a client/server architecture with one or more client computing platforms. The client computing platforms may be associated with the users of the virtual space. The server may be configured to execute one or more of a space module, a usage rate module, an activity parameter module, an activity execution module, and/or other modules.

The space module may be configured to execute an instance of a virtual space. The space module may implement the instance of the virtual space to facilitate user interactions with the virtual space. Such user facilitations may include providing virtual space activities to the users. A virtual space activity may provide an opportunity and/or motivation for a user to progress in the virtual space. One example of such virtual space activities is crafting activities. Crafting activities may be provided in the virtual space for users to combine, transform, or transmute virtual resources to produce correspond virtual items such as but not limited to, armor, weapon, potion, wardrobe, books, and/or any other virtual items. The crafting activities may be initiated by users in the instance of the virtual space by providing inputs in accordance with the parameters of the crafting activities.

Usage rate module may be configured to determine rates of user usage of the virtual space. The user usage rate may be determined to quantify a level of usage of the virtual space by the users. The usage rate may be determined based on an amount of time spent in the virtual space, an amount of virtual and/or real currencies spent in the virtual space, a number of quests, missions, campaign and/or any other virtual space activities participated in the virtual space, a number of virtual space locations engaged in the virtual space, and/or any other user interactions with the virtual space. In some implementations, the usage rate module may be configured to determine an amount of time a user spends in the virtual space in a period based on a number of play sessions by the user and an amount of time spent for the individual play sessions by the user. Examples of such a user usage rate may include an average amount of time over a real-world unit of time or sliding window (e.g., average daily play time), over a play session (e.g., average play time in a play session), the exact amount of time in the period or play session(s) for the period, and/or any other time measurement for the user in the virtual space.

Activity parameter module may be configured to determine parameters of crafting activities based on user usage rates of the virtual space. The determined parameters of a crafting activity may be used for execution of the crafting activity in the virtual space, e.g., by the activity execution module 112. Examples of crafting activity parameters may include, but not limited to, time, resource, crafting recipe, outcome, success rate and/or any other crafting activity parameters. The time parameter of a crafting activity may specify an amount of time for the crafting activity to complete in the virtual space. The resource parameter of the crafting activity may correspond to ingredients, materials, components, and the like needed for the crafting activity to produce one or more corresponding items in the virtual space. The recipe parameter of the crafting activity may provide a formula and/or a set of instructions through which the crafting activity may be executed in the virtual space. The outcome parameter may specify one or more virtual items that may be crafted by the crafting activity. The success rate parameter may specify a probability of success for the crafting activity—e.g., 90% chance that the crafting activity will produce a corresponding item for the user. In some implementations, these parameters for a crafting activity may be determined for an individual user by the activity parameter module based on an amount of time the user spent in the virtual space during a previous period of real-world time, during a play session(s), during a sliding window of real-world time and/or for any other amount of real-world time.

In some implementations, the activity parameter module may be configured to determine the crafting activity parameters based on one or more user normalization standards. The user normalization standards may be determined by the provider, administrator, moderator, and/or any other entities related to the virtual space to normalize interactions with the virtual space by the users. In some examples, the user normalization standards may relate to balancing differences of time spent in the virtual space by the users. Such user normalization standards may be used by the activity parameter module to determine crafting activity parameters for balancing time differences in participating in the crafting activities by the users. In some implementations, the activity parameter module 110 may be configured to determine the crafting activity parameters for an individual user based on one or more of a skill, an experience level, a class, a race, a profession, a virtual item owned, a power-ups earned, and/or any other characteristics by the user.

Activity execution module may be configured to execute crafting activities in the virtual space. Such executions may involve receiving input initiating execution of crafting activities, verifying the received user inputs against the parameters determined for the users by the activity parameter module, executing the crafting activities in accordance with the crafting activity parameters, and producing crafted virtual items in the virtual space at the end of the execution.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates an exemplary method for dynamically determining crafting parameters based on user usage rate of a virtual space.

FIG. 3 illustrates an exemplary method for dynamically determining crafting parameters based on user usage rate of a virtual space.

DETAILED DESCRIPTION

Figure 1:
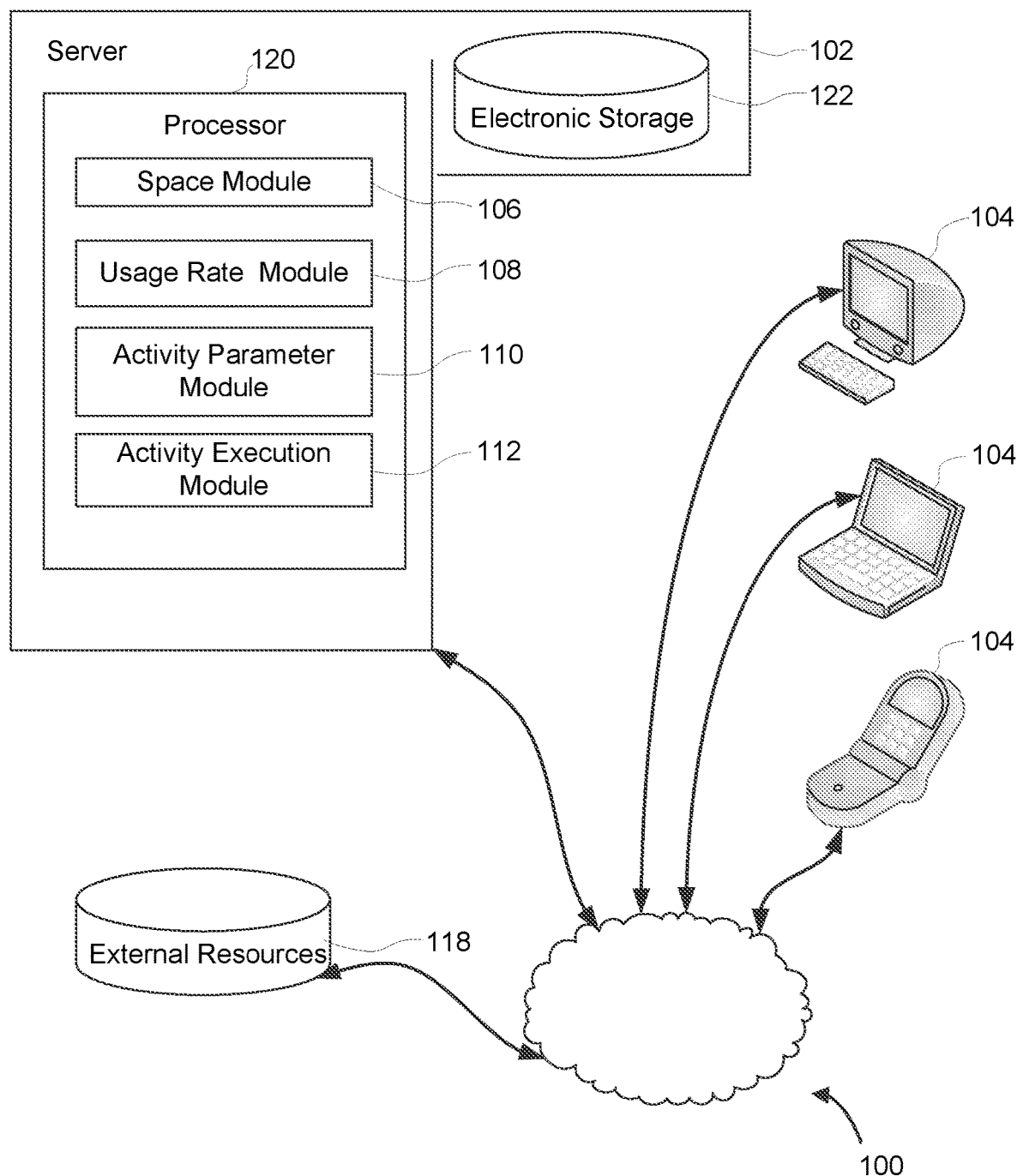
FIG. 1 illustrates one example of a system configured to dynamically determine crafting parameters based on user usage rate of a virtual space.

FIG. 1 illustrates one example of a system configured to dynamically determine crafting parameters based on user usage rate of a virtual space. For such dynamic determinations of crafting parameters, usage rates of a virtual space by the users may be determined to quantity levels of usage of the virtual space by the users for some real-world time. Based on such usage rates of the virtual space by the users, crafting parameters may be determined for individual users to facilitate their interactions with the virtual space. In some implementations, the crafting parameters may be determined based on one or more user normalization standards to balance differences in time spent in the virtual space by the users. As so determined, the crafting parameters may facilitate crafting activities in the virtual space that are attuned to produce balanced effects to the users. This may improve user experience with the virtual space by ameliorating imbalanced user progressions within the virtual space.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a usage rate module 108, an activity parameter module 110, an activity execution module 112, and/or other modules.

Space module 106 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user through a space interface implemented on client computing platform associated with the user. The space interface may be generated based on view information determined by the space module 106. The space interface may provide one or more virtual space controls to facilitate user actions in the virtual space by the user. The facilitated actions may include user engagement in a combat and/or defense, virtual space maneuvers, inventory management, city management, construction of infrastructure, mining activities, virtual recourses and/or items trading or purchasing, transferring virtual resources, items and/or entities, picking up virtual space resources, and/or any other actions in the virtual space.

In any case, the simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user, with which it is associated. The user controlled element(s) may move through and interact with the virtual space (e.g., non-user characters in the virtual space, other objects in the virtual space). The user may initiate maneuvers to direct the movements of controlled character in the virtual space. The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The user may participate in the instance of the virtual space by taking actions in the virtual space. In some implementations, the user actions may be enabled by physical controls provided by the client computing platforms client computing platform 104 through, such as but not limited to, play buttons, joysticks, motion sensors, cameras, keyboards, mouse, and/or any other control device provided by or coupled to client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled, the user may provide inputs to direct virtual space maneuvers, to participate in virtual activities and/or engage in other interactions within the virtual space. For example, a user may provide an input specifying an amount of troops to be marched to a virtual space location to defend that virtual space location. Commands may be generated for the user action and may be executed by the space module 106 in the virtual space such that the user interactions with the virtual space may be effectuated in the virtual space following the execution. Execution of such a command by the space module 106 may produce changes to the virtual space state, which may reflect progresses and/or results of the user initiated actions. In some examples, state changes caused by user actions may be recorded in the electronic storage 122 to facilitate persistency throughout the instance of the virtual space.

Within the instance of the virtual space executed by space module 106, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Within the instance of the virtual space executed by space module 106, virtual space activities may be provided for users to interact with the virtual space by the provider, administrator, moderator, and/or any other entities related to the virtual space. The virtual space activities may be provided by the provider, administrator, moderator, and/or any other entities related to the virtual space to present opportunities and/or motivations for users to progress in the virtual space. Typically, user may be facilitated, e.g., through space interfaces, to provide inputs to initiate and/or participate in the virtual space activities. One or more activity parameters may be specified, e.g., by the provider, administrator, moderator, and/or any other entities related to the virtual space for the execution of the virtual space activities. During and/or at the end of the virtual space activities, user progression in the virtual space, such as improvements in user character experience levels, skills, strength, infrastructure, virtual items, virtual space entities in control by the user and/or other improvement in virtual space aspects related to the user typically may result in the virtual space. Typically, such user progression in the virtual space may be reflected through state changes in the virtual space and recorded in virtual space one or more database (e.g., user profile, avatar, game, and/or any other virtual space database).

Some virtual space activities may require consumption of virtual resources. During a virtual space activity, an amount of the resources may be increased or decreased in the user inventory for the activity to reflect consumption (including exhaustion) or procurement of the resources due to the virtual space activity. Some virtual space activities may be associated with an amount of time duration for completion. Length of such time duration may vary based on various factors specific to the virtual space activities. For example, constructing a level 1 wall in the virtual space may require 30 minutes build time; constructing a level 2 wall may require 1 hour build time; constructing a level 3 wall may require 2 hour build time; constructing a level 4 wall may require 3 hour build time; and so on. The required time duration for an activity may be shortened by user consumption of virtual items and/or resources. For example, hourglasses may be consumed by users to shorten time duration for a building, training, research and/or any other activities within the virtual space.

Examples of virtual space activities may include crafting virtual items, constructing, upgrading, and/or demolishing buildings, training, marching, reinforcing, reassigning, recruiting, arranging formations, and/or transporting troops, attacking, developing, managing, demolishing and/or defending cities, realms, kingdoms, and/or any other virtual space locations, researching for skills levels, experiences, mining and/or prospecting for virtual resources, participating in missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities. Such virtual space activities typically provide opportunities and/or motivations for users to progress in the virtual space.

For instance, crafting activities may be provided in the virtual space for users to combine, transform, or transmute virtual resources to produce correspond virtual items such as but not limited to, armor, weapon, potion, wardrobe, books, and/or any other virtual items. The virtual items may be crafted for the crating users' own use in the virtual space and/or may be traded or sold in the virtual space to other users. A crafting activity may be initiated by a user in the virtual space by providing inputs. Following the user initiation of the crafting activity, the crafting activity may be executed in the virtual space in accordance with crafting activity parameters to reflect a corresponding crafting process within the virtual space.

Usage rate module 108 may be configured to determine rates of user usage of the virtual space. The user usage rate may be determined to quantify a level of usage of the virtual space by the users. The usage rate may be determined based on an amount of time spent in the virtual space, an amount of virtual and/or real currencies spent in the virtual space, a number of quests, missions, campaign and/or any other virtual space activities participated in the virtual space, a number of virtual space locations engaged in the virtual space, and/or any other user interactions with the virtual space. Such user usage rates may be determined dynamically by the usage rate module 108 based on a real-world time window. For example, a user spending within a past month may be obtained and a rate of an average daily spending in that month may be determined by the usage rate module 108 by dividing the obtained spending over a number of days in that month. In some implementations, such a dynamic determination of the user usage rate of the virtual space may be made at a sampling rate predetermined by the provider, administrator, moderator, and/or any other entities related to the virtual space at a configuration stage of the system 100. Simultaneously or alternatively, the provider, administrator, moderator, and/or any other entities related to the virtual space may determine the user usage rate of the virtual space during runtime of the system 100, e.g., through an interface.

In some implementations, the usage rate module 108 may be configured to determine an amount of time a user spent in the virtual space during a period. A user may participate in the virtual space through a virtual space user session. Such a virtual space user session may include complete activities of a user within the virtual space, from the very first action when the user joins the virtual space for the first time to the last action before the user stops participating in the virtual space for good. Accordingly, the virtual space user session typically finishes when the user decides to stop interacting with the virtual space for good or when provider, administrator, moderator, and/or any other entities related to the virtual space stop providing the virtual space to users for good. However, this is not necessary the only case, the virtual space user session may finish, in some examples, when one or more events or game conditions have occurred and/or when one or more objectives have been achieved or not achieved by the user as determined by the provider, administrator, moderator, and/or any other entities related to the virtual space. For example, the virtual user space user session may finish when the user has killed the last monster in the virtual space; fails to achieve certain score or experience level within predetermined time; the user character has been killed in the virtual space; and so on.

A virtual space user session may include one or more play sessions during which a user participates in the virtual space. That is, the time for the user to complete the virtual space user session may be divided into several different occasions—i.e., different play sessions. In some examples, a play session may start from when the user logs into and finish when the user logs off system 100 in one occasion. However, this is not necessary the only case. A play session may be determined by provider, administrator, moderator, and/or any other entities related to the virtual space in however measurements as desired. For example, a play session may be measured by duration of user participation in activities within the virtual space such that a play session finishes when the user stops participating in the activities.

In any case, an amount of time a user spends in the virtual space in a period may be determined by the usage rate module 108 based on the number of play sessions the user had with the virtual space and the amount of time spent for the individual sessions during that period. In some implementations, such user play session information may be obtained from a user module that manages individual user information related to the virtual space. In any case, with such user play session information, user usage rate, such as an average amount of time over a real-world unit of time or sliding window (e.g., average daily play time), over a play session (e.g., average play time per play session), an exact amount of time spent by the user in the virtual space during that period or during a play session, and/or any other user usage rate measuring an amount time the user spends in the virtual space for some real-world time may be determined by the usage rate module 108.

Activity parameter module 110 may be configured to determine parameters of crafting activities based on user usage rates of the virtual space. The determined parameters of a crafting activity may be used for execution of the crafting activity in the virtual space, e.g., by the activity execution module 112. Examples of crafting activity parameters may include, but not limited to, time, resource, recipe, outcome, success rate and/or any other crafting activity parameters. A time parameter of a crafting activity may specify an amount of time for the crafting activity to complete in the virtual space. Typically, crafting activities that produce more elaborate or powerful items may take longer time than others to complete in the virtual space. For example, crafting a level 1 sword may take 1 hour, while crafting a level 2 sword may take 2 hours to complete in the virtual space.

A resource parameter of the crafting activity may correspond to ingredients, materials, components, and the like needed for the crafting activity to produce one or more corresponding crafted items. During and/or at the end of the execution of the crafting activity in the virtual space, an amount and/or type(s) of the virtual resources specified by resource parameter may be consumed within the virtual space, e.g., through resource reduction in the user inventory to reflect consumption of the resources by the crafting activity.

A recipe parameter of the crafting activity may provide a formula and/or a set of instructions through which the crafting activity may be executed in the virtual space. For example, steps and/or orders of forging, drawing, bending, wielding, and/or finishing may be provided in a recipe for blacksmithing crafting activity. Accordingly, the execution of the blacksmithing activity may be carried out in the virtual space based on such a recipe.

An outcome parameter may specify one or more virtual items that may be crafted. Different types of crafting activities may produce different types of virtual items at the end of the execution of the crating activities in the virtual space. For example, alchemy crafting may produce healing potions; blacksmithing may produce weapons and/or armors; garment crafting may produce wardrobes having magic power; inscription may produce a book item; and so on. In some examples, within a type of crafting activity, different grades of a crafted item may be specified by the item parameter. For example, a level 1 sword may be produced by a blacksmithing activity that takes 1 hour, a level 2 sword may be produced by another blacksmith activity that take 2 hours; and so on.

A success rate parameter may specify a probability that the crafting activity will produce the virtual items as specified by the outcome parameter. For example, a success rate of 90% may be determined of a blacksmithing activity that produces a level 1 sword such that 9 of 10 times the blacksmithing activity will produce a level 1 sword for the initiating users. Typically, the success rate may vary depending on the recipe and/or the items to be produced. For example, the blacksmithing activity may have a 90% success rate when executing a recipe for crafting the level 1 sword, while have 50% success rate when executed a recipe for crafting the level 5 sword.

In any case, the activity parameter module 110 may determine the crafting activity parameters for individual users based on the user usage rate of the virtual space as determined by the usage rate module 108. For instance, the time parameter for a crafting activity may be determined for an individual user by the activity parameter module 110 based on an amount of time the user spent in the virtual space during a previous period of time (e.g., past hour, day, month, and etc.) and/or during a play session. For example, in a case where the user usage rate of the virtual space is 3 hour per play session, the time parameter for the crafting activity may be determined based on this rate such that the user may complete the crafting activity in a current play session, e.g. 2.8 hours for the crafting activity to complete. In another case where the user usage rate is 2.5 hour per play session, the time parameter for the same crafting activity may be determined as 2.5 hour such that the user may complete the crafting activity at the end of a current play session.

In another non-limiting example, the crafting activity parameters may be determined by the activity parameter module 110 based on a usage rate quantifying user spending in the virtual space. For instance, a user may spend on average 100 coins in the virtual space per play session for purchasing X amount of virtual resources, which may be used for the crafting activity. Based on this usage rate of the virtual space by the user, the activity parameter module 110 may determine that the virtual resources needed for the crafting activity as specified by the resource parameter for that user may be X+Y amount such that the user may still need to collect Y amount of resources for the crafting activity in a current play session in addition to the purchased X amount of virtual resources. In comparison, in the case where the user does not purchase any resources in a play session, the activity parameter module 110 may determine X-Y amount of resources are needed for the same crafting activity such that the user may need to collect resources for the crafting activity, but not as much as the user who otherwise would purchase X amount of the resources.

Other activity parameters of the crafting activity may be determined by the activity parameter module 110 similarly based on the usage rate of the virtual space by the user. For example, the recipe parameter may be determined by the usage rate module 108 to provide more step(s) for one user having a higher usage rate than another having a lower usage rate for the same crafting activity. Likewise, the outcome parameter may be determined by the usage rate module 108 to provide higher graded items for those user having low usage rates than what otherwise would be produced based on the low usage rate of those users; and the success rate parameter may be determined by the activity parameter module 110 to provide higher success rate for the crafting activity for such users than the success rate otherwise would be provided based on the low usage rate of those users.

In some implementations, the activity parameter module 110 may be configured to determine the crafting activity parameters based on one or more user normalization standards. In some examples, the user normalization standards may be determined by the provider, administrator, moderator, and/or any other entities related to the virtual space to normalize interactions with the virtual space by the users. Such user normalization standards may be used by the system 100 to provide user balances in the virtual space. For example, a normalization standard may be determined such that users with less experience points in the virtual space may be given a boost in competitions with users having higher experience points. In another example, a normalization standard may be determined such that users have secured controls of a large number of mines in the virtual space may collect resources from those mines slower than those users who have less number of mines in their controls. For providing such user balances in the virtual space, the user normalization standards may specify adjustments based on differences in virtual space interactions between the users. For example, in the case where two users engage in a competition (e.g., a PvP battle) in the virtual space and there is a 500 point difference in their virtual space experiences, an adjustment may be determined such that their experience difference may be reduced to 200 point during the competition.

In some examples, the user normalization standards may relate to balancing differences of time spent in the virtual space by the users. For example, a user normalization standard may be determined such that users who spend similar amounts of time daily in the virtual space may more or less achieve similar progression in the virtual space at the end of their daily play sessions. For instance, one user may spend 2 hour 10 minutes on average in the virtual space daily, and another user may spend 2 hour 20 minutes on average daily in the virtual space. For these two users, the user normalization standard may be used to balance their differences in time spent in the virtual space daily, i.e., a 10 minute difference, such that the daily 10 minute difference will not accumulate to result in bigger user imbalance as the two users progress in the virtual space. For example, the 10 minute differences may be offset by an amount (e.g., 5, 6, 7, 8, 9 10 minutes) such that the two users will progress in the virtual space daily more or less the same despite the 10 minute daily time difference.

Such a user normalization standard relating to balance differences in time spent in the virtual space by the users may be used by the activity parameter module 110 to determine crafting activity parameters. In the given example above, the time parameter of the crafting activity may be determined based on the user normalization standard such that the two users will complete the same craft activity in one day should they engage in that crafting activity despite their 10 minute difference. In some implementations, an adjustment value for the time parameter may be determined by the activity parameter module 110 to adjust the time parameter for individual users based on the user normalization standard. Still in the given example above, if a crafting activity takes 2 hour 30 minutes to complete without any adjustment, an adjustment value of 10 minutes may be determined for the first user such that the crafting activity may complete in 2 hour 20 minutes to complete for that user should that user engage in the crafting activity; and an adjustment value of 20 minutes may be determined for the second user such that the crafting activity may complete in 2 hour 10 minutes to complete for that user.

Similarly, the resource parameter may be determined by the activity parameter module 110 module based on the user normalization standards. For example, for users who spend less time in the virtual space daily, a less amount of virtual resource may be required for the crafting activity such that they may collect those resources to complete the crafting activity at the end of their play sessions, as compared to those required for users who spend more time in the virtual space. Likewise, the recipe parameter may be determined by the activity parameter module 110 such that the user who spend less time in the virtual space may only need to provide a less complete recipe to the crafting activity than those who spend more time in the virtual space. The outcome parameter may be determined such that the crafting activity initiated by the user who spends less time in the virtual space may produce higher graded items than those initiated by users who spend more time in the virtual space (e.g., an item grade boost to those users who spends less time in the virtual space than others). The success rate parameter may be determined such that the crafting activity initiated by the user who spends less time in the virtual space may have a higher success rate than those initiated by who spend more time in the virtual space (e.g., a success rate boost to those users who spends less time in the virtual space than others).

In some implementations, the activity parameter module 110 may be configured to determine the crafting activity parameters for an individual user based on one or more of a skill, an experience level, a class, a race, a profession, a virtual item owned, a power-ups earned, and/or any other characteristics by the user. Such determinations may be made to reflect a crafting process corresponding to the crafting activity that is appropriate for the user having the set of user characteristics.

Activity parameter module 110 may be configured to obtain one or more user normalization standards within the virtual space. In some implementations, the user normalization standards may be stored on the electronic storage 122 by the provider, administrator, moderator, and/or any other entities related to the virtual space. In those implementations, activity parameter module 110 may be configured to obtain the user normalization standards during runtime of the system 100 by accessing the electronic storage 122. In some examples, the user normalization standards may be determined by the provider, administrator, moderator, and/or any other entities related to the virtual space dynamically during runtime of system 100. In those examples, activity parameter module 110 may be configured to obtain the dynamically determined user normalization standards at a predetermined frequency, e.g., a sampling rate or at instructions of the provider, administrator, moderator, and/or any other entities related to the virtual space via a user interface to the activity parameter module 110.

Activity execution module 112 may be configured to execute crafting activities in the virtual space. Users may provide inputs to initiate crating activities in the virtual space. The user inputs may include a type of crafting activity to be carried out, a specific grade of item to be crafted by the crafting activity, equipment to be used, resources to be used, recipe to be used, and/or any other user inputs for initiating the crafting activity. Upon receiving such user inputs, the activity execution module 112 may be configured to verify the user inputs with the activity parameters for the specified crafting activity as determined by the activity parameter module 110. Error messages may be generated by the activity execution module 112 in cases where a mismatch is found between the user inputs and the crafting activity parameters. In cases where the user inputs are in accordance with the activity parameters determined for user by the activity parameter module 110, the activity execution module 112 executes the crafting activity in the virtual space so that one or more virtual items may be created in the virtual space at the end of the execution.

The server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 118, external entities participating with system 100, and/or other resources. In some implementations, some or all of the functionality attributed herein to external resources 118 may be provided by resources included in system 100.

Server 102 may include electronic storage 122, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112 and/or other modules. Processor 120 may be configured to execute modules 106, 108, 110, 112 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112 are illustrated in FIG. 1 as being implemented within a single processing unit, in implementations in which processor 122 includes multiple processing units, one or more of modules 106, 108, 110, 112 may be implemented remotely from the other modules. The description of the functionality provided by the different modules 106, 106, 108, 110, 112 described below is for illustrative purposes, and is not intended to be limiting, as any of modules 106, 108, 110, 112 may provide more or less functionality than is described. For example, one or more of modules 106, 108, 110, 112 may be eliminated, and some or all of its functionality may be provided by other ones of modules 106, 108, 110, 112. As another example, processor 120 may be configured to execute one or more additional modules that may perform some or all of the functionality attributed below to one of modules 106, 108, 110, 112.

It is understood that the above description of system 100 is merely illustrated as one example of a system configured to dynamically determine crafting parameters based on user usage rate of the virtual space. It should be appreciated that in some examples, a localized system 100 may be configured according to a stand-alone architecture such that the system configured to provide rewards to a user in a virtual space based on user performance of gesture in accordance with the disclosure may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU may be configured to communicate virtual space state information to the GPU through any suitable wired or wireless communications such as, but not limited to, a point-to-point communication like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate in concert to achieve all or some of the functions of 106, 108, 110, 112, as described above.

FIG. 2 illustrates an exemplary method 200 for dynamically determining crafting parameters based on user usage rate of a virtual space. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 202, an instance of a virtual space may be executed and implemented to determine view information for transmission to one or more client computing platforms associated with users. The users may participate in the virtual space by participating in activities provided therein. In some implementations, operation 202 may be performed by a space module the same as or similar to space module 106 (shown in FIG. 1 and described herein).

At operation 204, one or more crafting activity parameters may be determined for a crafting activity. Examples of crafting activity parameters may include, but not limited to, time, resource, recipe, item that may be crafted, and/or any other crafting activity parameters. The determined parameters of a crafting activity may be used to execute the crafting activity in the virtual space. In some implementations, operation 204 may be performed by an activity parameter module the same as or similar to activity parameter module 110 (shown in FIG. 1 and described herein).

At operation 206, the crafting activity for which parameters are determined in operation 204 may be provided to users in the virtual space. In some implementations, operation 206 may be performed by a space module the same as or similar to space module 106 (shown in FIG. 1 and described herein).

At operation 208, user inputs initiating execution of the crafting activity provided to users in operation 206 may be received from a user. In some implementations, operation 208 may be performed by a space module the same as or similar to space module 106 (shown in FIG. 1 and described herein).

At operation 210, a usage rate of the virtual space by the user whose inputs initiating the crafting activity is received in operation 208 may be determined. The user usage rate may be determined to measure a level of interaction with the virtual space by the users, such as, but not limited to, an amount of time spent in the virtual space, an amount of virtual and/or real currencies spent in the virtual space, a number of quests, missions, campaign and/or any other virtual space activities participated in the virtual space, a number of virtual space locations engaged in the virtual space, and/or any other user interactions with the virtual space. In some implementations, operation 210 may be performed by a usage rate module the same as or similar to space module usage rate module 108 (shown in FIG. 1 and described herein).

At operation 212, the crafting activity parameters may be adjusted for the user based on the usage rate of the virtual space by the user determined in operation 210. In some implementations, for such an adjustment, one or more user normalization standards may be obtained. The user normalization standards may relate to balancing differences of time spent in the virtual space by the users. Based on the obtained user normalization standards, adjustment values for the crafting activity parameters may be determined to adjust the time parameter for the user. In some implementations, operation 212 may be performed by an activity parameter module the same as or similar to activity parameter module 110 (shown in FIG. 1 and described herein).

At operation 214, the user inputs received in operation 208 may be verified against the parameters of the crafting activity. In some implementations, operation 214 may be performed by an activity execution module the same as or similar to activity execution module 112 (shown in FIG. 1 and described herein).

At operation 216, a determination whether the user inputs are in accordance with the parameters of the crafting activity is made. In some implementations, operation 216 may be performed by an activity execution module the same as or similar to activity execution module 112 (shown in FIG. 1 and described herein).

At operation 218, in cases where it is determined that the user inputs received in operation 208 are in accordance with the crafting activity parameters, the crafting activity may be executed in the virtual space for the user. In some implementations, operation 218 may be performed by an activity execution module the same as or similar to activity execution module 112 (shown in FIG. 1 and described herein).

At operation 220, one or more crafted items may be produced in the virtual space based on the execution of the crafting activity. In some implementations, operation 220 may be performed by an activity execution module the same as or similar to activity execution module 112 (shown in FIG. 1 and described herein).

FIG. 3 illustrates another exemplary method 300 for dynamically determining crafting parameters based on user usage rate of a virtual space. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a virtual space may be executed and implemented to determine view information for transmission to one or more client computing platforms associated with users. The users may participate in the virtual space by controlling entities therein. In some implementations, operation 302 may be performed by a space module the same as or similar to space module 106 (shown in FIG. 1 and described herein).

At operation 304, one or more crafting activity parameters may be determined for a crafting activity for a user based on a usage rate of the virtual space by the user. Examples of crafting activity parameters may include, but not limited to, time, resource, crafting recipe, item that may be crafted, and/or any other crafting activity parameters. The determined parameters of a crafting activity may be used to execute the crafting activity in the virtual space. The user usage rate may be determined to measure a level of interaction with the virtual space by the users, such as, but not limited to, an amount of time spent in the virtual space, an amount of virtual and/or real currencies spent in the virtual space, a number of quests, missions, campaign and/or any other virtual space activities participated in the virtual space, a number of virtual space locations engaged in the virtual space, and/or any other user interactions with the virtual space. The determined crafting activity parameters based on the user usage rate of the virtual space may provide the user an opportunity to complete the crafting activity in or at the end of a play session, a period, and/or any other virtual space or real-world time window. In some implementations, operation 304 may be performed by an activity parameter module the same as or similar to activity parameter module 110 (shown in FIG. 1 and described herein).

At operation 306, the crafting activity for which parameters are determined in operation 304 may be provided to the user in the virtual space. In some implementations, operation 306 may be performed by a space module the same as or similar to space module 106 (shown in FIG. 1 and described herein).

At operation 308, user inputs initiating execution of the crafting activity provided to users in operation 306 may be received from the user. In some implementations, operation 308 may be performed by a space module the same as or similar to space module 106 (shown in FIG. 1 and described herein).

At operation 310, the user inputs received in operation 308 may be verified against the parameters of the crafting activity. In some implementations, operation 310 may be performed by an activity execution module the same as or similar to activity execution module 112 (shown in FIG. 1 and described herein).

At operation 312, a determination whether the user inputs are in accordance with the parameters of the crafting activity is made. In some implementations, operation 312 may be performed by an activity execution module the same as or similar to activity execution module 112 (shown in FIG. 1 and described herein).

At operation 314, in cases where it is determined that the user inputs received in operation 308 are in accordance with the crafting activity parameters, the crafting activity may be executed in the virtual space for the user. In some implementations, operation 314 may be performed by an activity execution module the same as or similar to activity execution module 112 (shown in FIG. 1 and described herein).

At operation 316, one or more crafted items may be produced in the virtual space based on the execution of the crafting activity. In some implementations, operation 316 may be performed by an activity execution module the same as or similar to activity execution module 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to dynamically determine crafting parameters based on rates of usage by users in a virtual space, the system comprising:
    a computer-readable storage medium storing machine-readable instructions; and
    one or more processors configured by machine-readable instructions to:
        execute an instance of the virtual space including implementing the instance of the virtual space by receiving inputs from multiple users and executing corresponding commands to facilitate interaction by individual ones of the multiple users, the inputs including inputs initiating crafting activities in the virtual space, wherein the crafting activities are executed in the virtual space in accordance with crafting activity parameters;
        determine, for individual ones of the multiple users, individual rates of usage of the virtual space based on average amounts of time spent in the virtual space over a sliding window of a real-world unit of time, such that a first rate of usage of the virtual space by a first user is determined based on an average amount of time the first user has spent in the virtual space over a first sliding window of a first real-world unit of time, and further such that a second rate of usage of the virtual space by a second user is determined based on a second average amount of time the second user has spent in the virtual space over a second sliding window of a second real-world unit of time;
        determine for the individual ones of the multiple users, the crafting activity parameters of the crafting activities based on the individual rates of usage by the individual ones of the multiple users, such that a first set of parameters of a first crafting activity is determined for the first user based on the first rate of usage by the first user, and further such that a second set of parameters of the first crafting activity is determined for the second user based on the second rate of usage by the second user, wherein the first set of parameters of the first crafting activity includes a first time parameter that defines an amount of time required to complete the first crafting activity for the first user, wherein the second set of parameters of the first crafting activity includes a second time parameter that defines a second amount of time required to complete the first crafting activity for the second user, and wherein the first time parameter is greater than the second time parameter responsive to the first rate of usage by the first user being greater than the second rate of usage by the second user; and
        execute for individual ones of the multiple users, one or more of the crafting activities initiated by the individual ones of the multiple users, such that the first crafting activity, initiated by the first user in accordance with the first set of parameters and by the second user in accordance with the second set of parameters, is executed in the virtual space to produce corresponding virtual items for each of the first user and the second user.

2. The system of claim 1, wherein the inputs received from the multiple users are concurrent inputs.

3. The system of claim 1, wherein the crafting activities include activities that combine, transform, and/or transmute virtual resources to produce the corresponding virtual items.

4. The system of claim 1, wherein the users are capable of spending real-world currency in the virtual space.

5. The system of claim 1, wherein the first sliding window of the first real-world unit of time is the same as the second sliding window of the second real-world unit of time.

6. The system of claim 1, wherein the one or more processors are configured by machine-readable instructions such that the first set of parameters of the first crafting activity includes one or more of a resource, time, recipe, outcome, or success rate parameter.

7. The system of claim 1, wherein the one or more processors are further configured by machine-readable instructions such that the determination of the first set of parameters of the first crafting activity is further based on one or more of a skill, an experience level, a class, a race, a profession, a virtual item owned, or a power-ups earned by the first user.

8. A method for dynamically determining crafting parameters based on rates of usage by users in a virtual space, the method being implemented in one or more physical processors configured by machine-readable instructions, the method comprising:
    executing an instance of the virtual space;
    implementing the instance of the virtual space by receiving inputs from multiple users and executing corresponding commands to facilitate interaction by individual ones of the multiple users, the inputs including inputs initiating crafting activities in the virtual space, wherein the crafting activities are executed in the virtual space in accordance with crafting activity parameters;

determining, for individual ones of the multiple users, individual rates of usage of the virtual space based on average amounts of time spent in the virtual space over a sliding window of a real-world unit of time, such that a first rate of usage of the virtual space by a first user is determined based on an average amount of time the first user has spent in the virtual space over a first sliding window of a first real-world unit of time, and further such that a second rate of usage of the virtual space by a second user is determined based on a second average amount of time the second user has spent in the virtual space over a second sliding window of a second real-world unit of time;

determining for the individual ones of the multiple users, the crafting activity parameters of the crafting activities based on the individual rates of usage by the individual ones of the multiple users, such that a first set of parameters of a first crafting activity is determined for the first user based on the first rate of usage by the first user, and further such that a second set of parameters of the first crafting activity is determined for the second user based on the second rate of usage by the second user, wherein the first set of parameters of the first crafting activity includes a first time parameter that defines an amount of time required to complete the first crafting activity for the first user, wherein the second set of parameters of the first crafting activity includes a second time parameter that defines a second amount of time required to complete the first crafting activity for the second user, and wherein the first time parameter is greater than the second time parameter responsive to the first rate of usage by the first user being greater than the second rate of usage by the second user; and executing for individual ones of the multiple users, one or more of the crafting activities initiated by the individual ones of the multiple users, such that the first crafting activity, initiated by the first user in accordance with the first set of parameters and by the second user in accordance with the second set of parameters is executed in the virtual space to produce corresponding virtual items for each of the first user and the second user.

9. The method of claim 8, wherein the inputs received from the multiple users are concurrent inputs.

10. The method of claim 8, wherein the crafting activities include activities that combine, transform, and/or transmute virtual resources to produce the corresponding virtual items.

11. The method of claim 8, wherein the users are capable of spending real-world currency in the virtual space.

12. The method of claim 8, wherein the first sliding window of the first real-world unit of time is the same as the second sliding window of the second real-world unit of time.

13. The method of claim 8, wherein the first set of parameters of the first crafting activity includes one or more of a resource, time, recipe, outcome, or success rate parameter.

14. The method of claim 8, wherein determining the first set of parameters of the first crafting activity is further based on one or more of a skill, an experience level, a class, a race, a profession, a virtual item owned, or a power-ups earned by the first user.

* * * * *